(12) United States Patent
Makiya et al.

(10) Patent No.: US 7,141,765 B2
(45) Date of Patent: Nov. 28, 2006

(54) HEAT TREATING DEVICE

(75) Inventors: Toshiyuki Makiya, Tachikawa (JP); Takanori Saito, Shiroyama-Machi (JP); Karuki Eickmann, Shiroyama-Machi (JP); Sanjeev Kaushal, Austin, TX (US); Anthony Dip, Austin, TX (US); David L. O'meara, Hopewell Junction, NY (US)

(73) Assignee: Tokyo Electron Limited, Tokyo-To (JP)

( * ) Notice: Subject to any disclaimer, the term of this patent is extended or adjusted under 35 U.S.C. 154(b) by 136 days.

(21) Appl. No.: 10/473,248

(22) PCT Filed: Mar. 20, 2002

(86) PCT No.: PCT/JP02/02710

§ 371 (c)(1),
(2), (4) Date: Sep. 29, 2003

(87) PCT Pub. No.: WO02/082524

PCT Pub. Date: Oct. 17, 2002

(65) Prior Publication Data

US 2004/0115585 A1 Jun. 17, 2004

(30) Foreign Application Priority Data

Mar. 30, 2001 (JP) ............................. 2001-100032

(51) Int. Cl.
*H05B 1/02* (2006.01)
*A21B 1/00* (2006.01)

(52) U.S. Cl. ...................... 219/494; 219/412

(58) Field of Classification Search ................ 219/391, 219/412, 482, 490, 491, 494, 502, 509, 510; 438/636

See application file for complete search history.

(56) References Cited

U.S. PATENT DOCUMENTS

| 567,689 | A | | 9/1896 | Reilly et al. |
| 5,066,615 | A | * | 11/1991 | Brady et al. ............... 438/636 |
| 6,077,777 | A | | 6/2000 | Ha |

FOREIGN PATENT DOCUMENTS

| EP | 0 274 077 | | 7/1988 |
| JP | 07-181085 | | 7/1995 |
| JP | 11224130 | * | 8/1999 |

OTHER PUBLICATIONS

International Preliminary Examination Report (PCT/IPEA/409) (translated) issued for PCT/JP02/02710.
Notification of Transmittal of Copies of Translation of the International Preliminary Examination Report (PCT/IB/338).

* cited by examiner

*Primary Examiner*—Tu Hoang
(74) *Attorney, Agent, or Firm*—Smith, Gambrell & Russell, LLP (57) ABSTRACT

A antireflective film 50 is formed on a thermocouple 42 arranged in a processing vessel 1 of a heat treatment apparatus in order to improve the transient response characteristics of the thermocouple 42. In a typical embodiment, the thermocouple 42 is made by connecting a platinum wire 43A and a platinum-rhodium alloy wire 43B, and the antireflective film 50 is composed by stacking a silicon nitride layer 50C, silicon layer 50B and a silicon nitride layer 50A in that order.

11 Claims, 5 Drawing Sheets

PRIOR ART

FIG. 6

HEAT TREATING DEVICE

BACKGROUND OF THE INVENTION

1. Field of the Invention

The present invention relates to a heat treatment apparatus, more specifically to a technique that improves accuracy of temperature measurement of the object to be processed, such as a semiconductor wafer.

2. Description of the Related Art

The semiconductor device manufacturing process employs several sorts of heat treatment apparatuses that perform heat treatments, such as oxidation, diffusion, and film-forming. A batch-type, vertical-type heat treatment apparatus, which performs a heat treatment to a plurality of objects at one time, is known as one of the aforementioned heat treatment apparatuses.

With the batch-type, vertical-type heat treatment apparatus, a plurality of semiconductor wafers are held by a wafer boat vertically spaced at intervals, and then the wafer boat is loaded into the processing vessel. The semiconductor wafers are heated up to a predetermined temperature by means of a tubular heater surrounding the processing vessel, and then the semiconductor wafers are subjected to a predetermined treatment. A temperature controller controls the output power of the heater based on the temperature data measured by a temperature sensor unit arranged in the processing vessel, thereby the interior of the processing vessel, and thus the semiconductor wafers, is maintained at a predetermined temperature.

In order to obtain films having excellent property and uniform quality, uniform temperature distribution on each semiconductor wafer and between semiconductor wafers respectively placed at different heights is necessary. Thus, the interior of the processing vessel is divided into a plurality of heating zones, and the output power of each heater corresponding to each heating zone is independently controlled.

The temperature sensor unit used in such heat treatment apparatus is composed of: a straight protective tube made of quartz and extending vertically in the processing vessel; and thermocouples arranged in the protective tube at positions respectively corresponding to the heating zones. The thermocouples measure temperatures at positions in the processing vessel respectively corresponding to the heating zones, and the calorific power of the heaters is controlled based on the measured temperatures.

Figure 6:
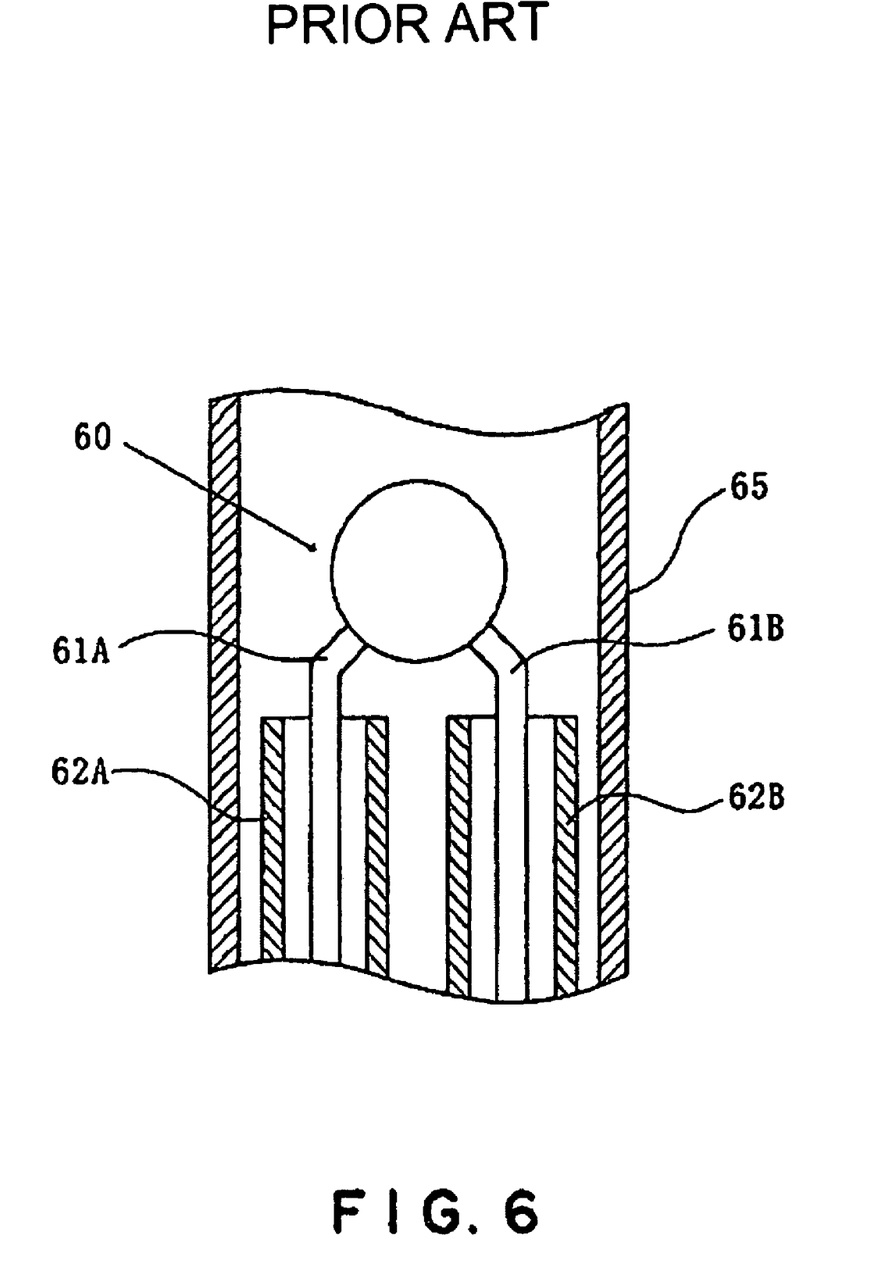
FIG. 6 is a cross-sectional view of a conventional thermocouple, showing the structure thereof.

FIG. 6 shows a typical structure of a conventional temperature sensor unit. A thermocouple 60 is made by connecting a metallic wire 61A of platinum and a metallic wire 61B of platinum-rhodium alloy. The metallic wires 61A and 61B are inserted into tubular, electrically insulative members 62A and 62B, which are made of alumina ceramics. The metallic wires 61A and 61B extend within a protective tube 65 made of quartz, are drawn outside the end part of the protective tube 65, and are connected to a controller.

However, the transient response of the above temperature sensor unit is slow in view of the temperature rising rate of the semiconductor wafer, when they are being heated rapidly. If the rising of the temperature measured by thermocouple is slower than the rising of the actual temperature of the semiconductor wafer when the semiconductor wafer is heated, accurate temperature control is difficult, and thus a long time period is required for the semiconductor wafers to reach a stable condition in which they are at the predetermined process temperature. This lengthens the total processing time, resulting in reduction in throughput.

SUMMARY OF THE INVENTION

The object of the present invention is to improve the transient response of the temperature sensor of a heat treatment apparatus, thereby to provide a heat treatment apparatus capable of adjusting the temperature of the object quickly.

The inventors of the present investigated the cause of the slow transient response of the temperature sensor. They found that the slow transient response is caused by the fact that the reflectivity of the metallic wires (platinum wire and rhodium wire) of the thermocouple for the radiant light emitted from the object to be processed is high and thus the emissivity of the metallic wires is low, due to the metallic luster of the metallic wires. Further, the inventors found that a heat capacity of the thermocouple unit is increased due to provision of the tubular, electrically insulative member, which also results in the slow transient response. The inventors concluded that the response of the thermocouple to the radiant light emitted from the object can be improved by improving the emissivity of the thermocouple, and they completed the present invention.

The present invention provides a heat treatment apparatus including: a processing vessel; a heater adapted to heat an object to be processed placed in the processing vessel; a temperature sensor unit arranged in the processing vessel; and a controller adapted to control an output power of the heater based on a temperature data measured by the temperature sensor, wherein the temperature sensor unit includes a protective tube and a thermocouple having a pair of metallic wires contained in the protective tube and connected to each other at a connection, and wherein a film having an antireflective function is formed at least on a surface of the connection of the metallic wires.

The reflectivity of a portion, on which is the film is formed, of the thermocouple for a light of any wavelength within the range of 0.5 to 5μm is preferably 80% or below, more preferably 50% or below.

Preferably, the film having the antireflective function is electrically insulative.

Preferably, the film having the antireflective function is composed of a plurality of layers. In this case, with respect to the thickness of the film, the uppermost layer is preferably electrically insulative, and a layer directly contacting the metallic wires is preferably made of a material inert to the metallic wire.

In a typical embodiment of the present invention, the metallic wires of the thermocouple may be made of platinum and platinum-rhodium alloy, respectively, and the film having the antireflective function may be composed of a silicon nitride layer, a silicon layer and a silicon nitride layer formed on the metallic wires in that order. The silicon layer may be doped with phosphate.

According to the present invention, the reflectivity of the temperature measuring portion of the thermocouple can be reduced and the emissivity thereof can be increased.

In the event that the film includes an electrically insulative layer, it is not necessary to coat the metallic wires of each thermocouple with electrically insulative tube, resulting in reduction in heat capacity of the thermocouple unit.

According to the present invention, the transient response of the thermocouple is improved, and thus the temperature of the object can be measured with high accuracy. Thus the heater can be controlled accurately.

DESCRIPTION OF THE PREFERRED EMBODIMENTS

Figure 1:
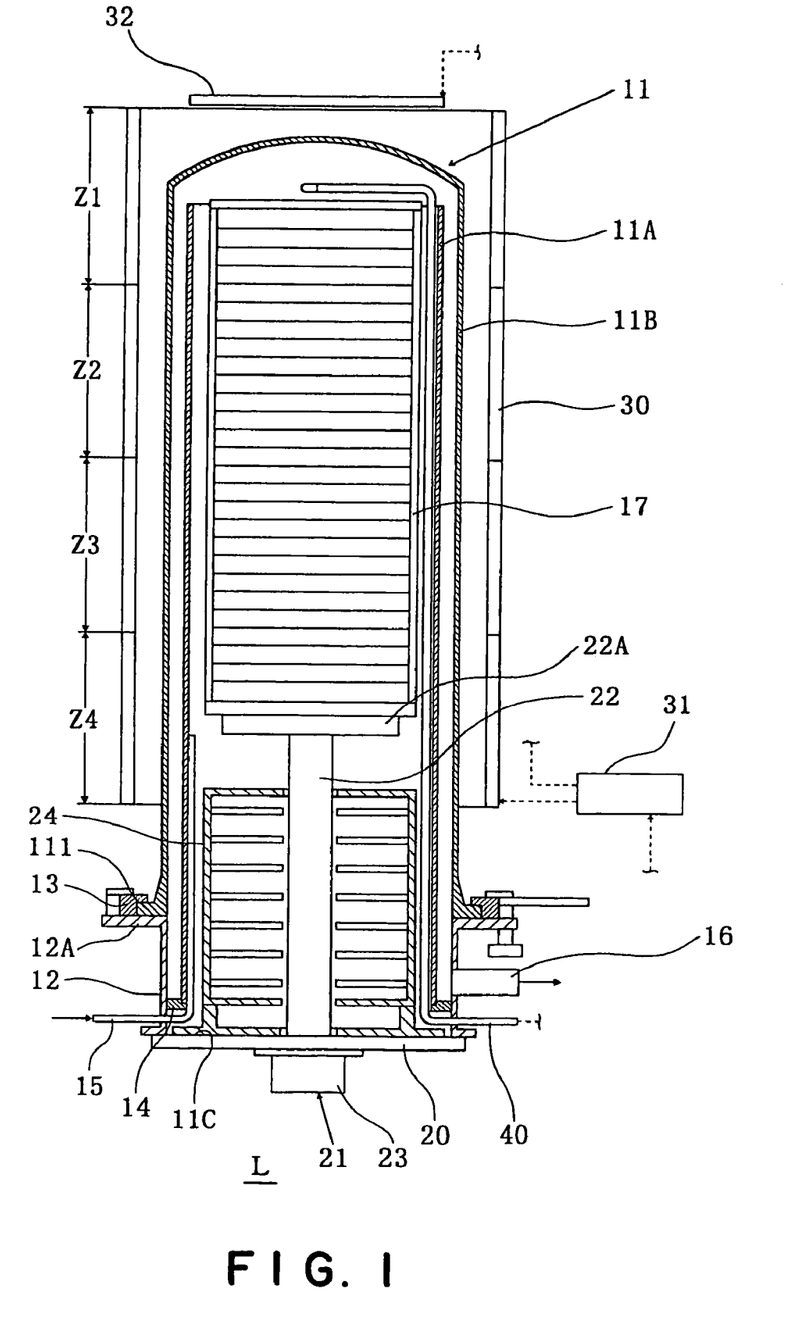
FIG. 1 is a cross-sectional view of a vertical-type heat treatment apparatus in one embodiment of the present invention, schematically showing the structure thereof.

A vertical-type heat treatment apparatus, which is one embodiment of the present invention and performs a film-forming process on semiconductor wafers by a CVD process, is described below with reference to the drawings. FIG. 1 is a cross-sectional view of a vertical-type heat treatment apparatus according to the present invention, schematically showing the structure thereof.

The vertical-type heat treatment apparatus comprises a processing vessel (processing tube) 11 of a dual-tube structure, which includes a straight inner tube 11A extending vertically and an outer tube 11B concentrically surrounding the inner tube 11A with a certain gap therebetween. An upper end of the inner tube 11A is opened, and an upper end of the outer tube 11B is closed. A space below the processing vessel 11 serves as a loading area L where semiconductor wafers are loaded onto and unloaded from a wafer boat 17, i.e., an object holder. The inner tube 11A and the outer tube 11B are made of a material that has excellent heat resistance and corrosion resistance, such as quartz glass of a high degree of purity.

The processing vessel 11 includes a short cylindrical manifold 12 which is connected to a lower end portion of the outer tube 11B. The manifold 12 has a flange 12A at its upper end. A flange 111 is disposed at a lower end portion of the outer tube 11B. The flanges 12A and 111 are connected to each other by a flange presser 13 with a sealing means (not shown) such as O-ring being interposed between the flanges 12A and 111.

The inner tube 11A extends downward beyond a lower end of the outer tube 11B to be inserted into the manifold 12, and is supported by an annular, inner tube support 14 disposed on an inner surface of the manifold 12.

A gas supply pipe 15 for introducing a process gas and an inert gas into the processing chamber 11 passes through one side of a sidewall of the manifold 12 to extend upward in the inner tube 11A. A space between the sidewall of the manifold 12 and the gas supply pipe 15 is sealed in an airtight fashion. The gas supply pipe 15 is connected to a gas supply source, not shown.

An exhaust port 16 for discharging air in the processing vessel 11 is disposed on the other side of the sidewall of the manifold 12. The exhaust port 16 is connected to an exhaust mechanism (not shown) which has, for example, a vacuum pump and a pressure control mechanism, by which a pressure in the processing vessel 11 is controlled.

Provided below the processing vessel 11 is an elevating mechanism 21, which vertically moves the wafer boat 17 to be loaded into and unloaded from the processing vessel 11. The elevating mechanism 21 includes a disk-shaped lid 20 adapted to close a lower end opening 11C of the processing vessel 11. The wafer boat 17 is made of quartz glass of a high degree of purity. Plural pieces, for example, about 100 to 150 pieces, of semiconductor wafers are held on the wafer boat 17 while vertically spaced at predetermined intervals, for example, 5.2 to 20.8 mm.

A columnar support member 22 is attached to the lid 20 to extend upward in parallel with an axis of the processing vessel 11. The support member 22 passes through the lid 20. A disk-shaped boat support 22A adapted to support the wafer boat 17 thereon is provided integrally with the support member 22 at the upper end thereof. A lower end of the support member 22 is connected to a rotary driving means 23 provided below the lid 20. A heat insulating tube 24 is arranged on the lid 20, with the support member 22 passing through the heat insulating tube 24.

A tubular heater 30 is arranged outside the processing vessel 11 to heat semiconductor wafers received in the processing vessel 11 up to a predetermined process temperature. The tubular heater 30 has a cylindrical heat insulating member, not shown. Wire-shaped resistance heaters are arranged on the inner surface of the heat insulating member in a helical or serpentine pattern. The resistance heaters are connected to a controller 31 which controls an electrical power to be supplied to the wires in order to achieve a predetermined temperature for the semiconductor wafers based on a temperature data measured by a temperature sensor unit 40, which is described below.

An interior of the processing vessel 11 is vertically divided into a plurality of heating zones. Four heating zones Z1 to Z4 are illustrated. The tubular heater 30 is capable of performing a so-called zone control. That is, the tubular heater 30 is capable of independently controlling temperatures in the respective heating zones.

Each of the resistance heaters is arranged exclusively in one of the heating zones, and the controller 31 can independently control electrical power to be supplied to the resistance heaters.

A plane heater 32 is arranged above the processing vessel 11 in parallel with an upper end surface of the tubular heater 30 to face the wafer boat 17 in the processing vessel 11. The plane heater 32 prevents heat from being released from an upper part of the processing vessel 11, and thus the semiconductor wafers can be heated with an enhanced in-plane uniformity. The plane heater 32 has wire-shaped resistance heaters arranged on a plate-shaped base member. The resistance heaters are also connected to the controller 31.

The processing vessel 11 has the temperature sensor unit 40 therein. Calorific powers of the tubular heater 30 and the plane heater 32 are controlled based on a temperature data measured by the temperature sensor unit 40.

The temperature sensor unit 40 passes through the sidewall of the manifold 12 below the exhaust port 16. The sidewall of the manifold 12 and the temperature sensor unit 40 are sealed in an airtight fashion. The temperature sensor unit 40 extends upward in an annular space formed between the wafer boat 17 and the inner tube 11A in parallel with an inner wall of the inner tube 11A. A tip portion of the temperature sensor unit 40 is curved above an upper end of the inner tube 11A to extend toward a center of the process ing vessel 11 in parallel with surfaces of the semiconductor wafers held in the wafer boat 17.

Figure 2:
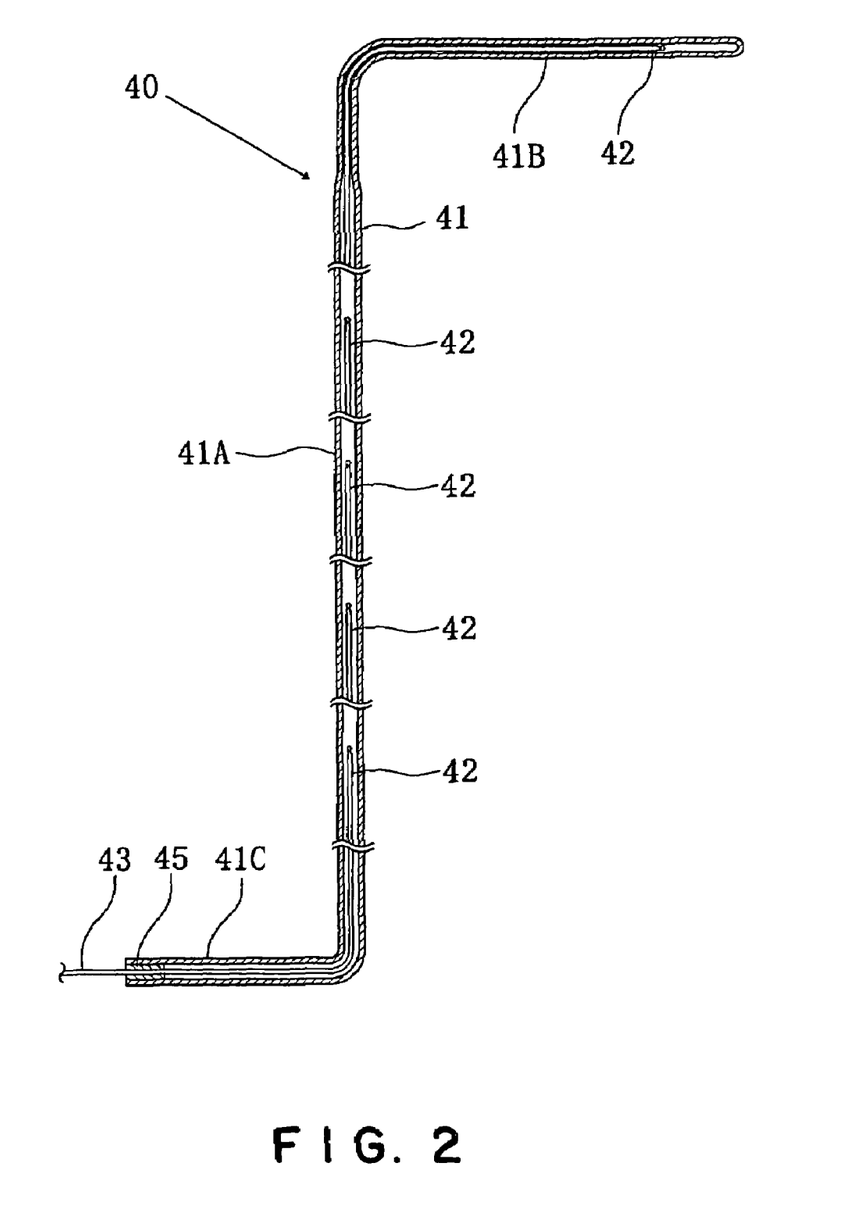
FIG. 2 is a cross-sectional view of a temperature sensor unit shown in FIG. 1, showing the structure thereof.

As shown in FIG. 2, the temperature sensor unit 40 includes a protective tube 41 made of transparent quartz glass, and a plurality of thermocouples 42 (five thermocouples are shown) contained in the protective tube 41. The thermocouples 42 are located at a position corresponding to a heating zone heated by the plane heater 32 (for example, a position directly below a center of the plane heater 32), and positions corresponding to the respective heating zones Z1 to Z4 heated by the tubular heater 30.

The protective tube 41 has first portion 41A extending straight and vertically, a second portion 41B successive to an upper end of the first portion 41A to extend in a horizontal direction (right direction in FIG. 2) perpendicular to an axis of the first portion 41A, and a base end portion 41C successive to a lower end of the first portion 41A to extend horizontally (opposite direction of the second portion 41B).

A distal end of the protective tube 41, i.e., a distal end of the second portion 41B, is closed. A proximal end of the protective tube 41, i.e., a proximal end of the base end portion 41C, is sealed by a sealant 45 such as an adhesive. Metallic wires 43 of the respective thermocouples 42 are drawn outside the protective tube 41 through the sealant 45. The metallic wires 43 of the respective thermocouples 42 are connected to input terminals of the controller 31 via compensating lead wires.

The base end portion 41C of the protective tube 41 may be sealed by the sealant 45 in an airtight fashion. In this case, the protective tube 41 may be filled with inert gas, such as nitrogen gas ($N_2$ gas), for preventing an oxidation of the thermocouples 42.

Alternately, an atmosphere of a reduced pressure may be established in the interior of the protective tube 41. Thus, even if the protective tube 41 is broken when the interior of the processing vessel 11 is at a reduced pressure, the broken pieces of the protective tube 41 are prevented from scattering in the processing vessel 11.

Preferably, an annular groove (not shown) may be formed along the whole circumference of the base end portion of the protective tube 41, and the sidewall of the manifold 12 may be fitted in the annular groove. Thus, when the processing vessel 11 is at a reduced pressure, the temperature sensor unit 40 is prevented from being drawn into the processing vessel 11.

Figure 3:
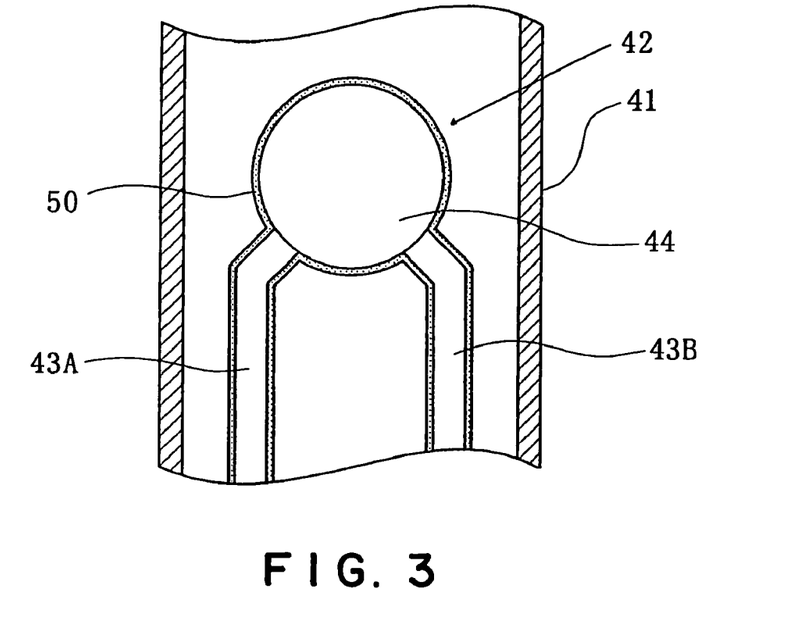
FIG. 3 is a cross-sectional view of a thermocouple of the temperature sensor unit shown in FIG. 2, showing the structure thereof.
Figure 4:
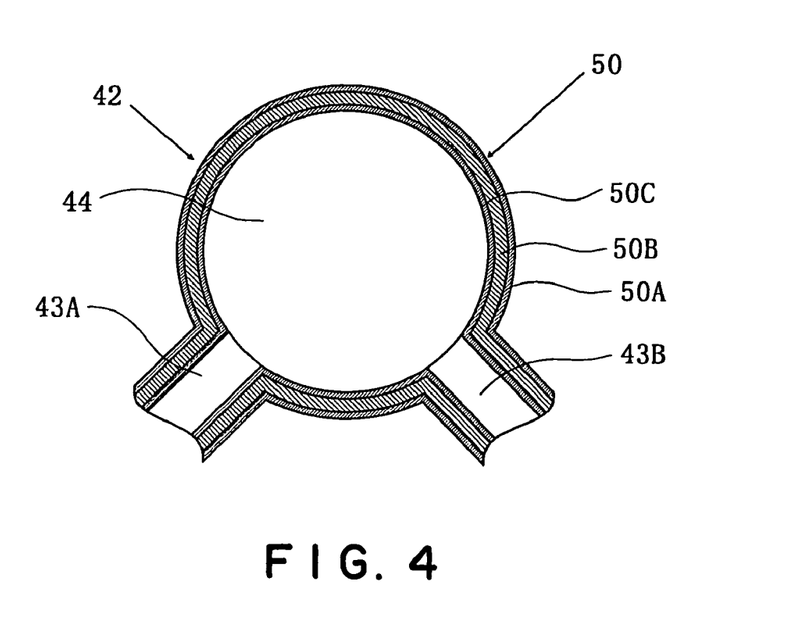
FIG. 4 is a cross-sectional view of the metallic wires of the thermocouple and a film formed on the connection of the metallic wires, schematically showing the structure thereof.

Diameters of the metallic wires 43 of the thermocouples 42 are about 0.5 mm, for example. Pairs of metallic wires 43 of each thermocouple are composed of a platinum (Pt) wire 43A and a platinum-rhodium alloy (Pt/Rh) wire 43B. As shown in FIGS. 3 and 4, a film 50 is formed on surfaces of the respective metallic wires 43A and 43B, and on a surface of a connection 44 where the metallic wires 43A and 43B are connected to each other, that is, a portion which measures a temperature.

The film 50 has an antireflective function for a light of any wavelength within a predetermined wavelength range. When forming the film 50 having the antireflective function on the surfaces of the respective metallic wires 43A and 43B and the connection 44 thereof, a reflectivity of such portion for a light of any wavelength within the range of 0.5 to 5 µm (micrometers) is low, as compared to the reflectivity of the surfaces of the respective wires 43A and 43B and the connection 44 thereof where the film 50 is not formed.

The film 50 may be composed of a plurality of layers of inorganic materials stacked with respect to the thickness of the film. An uppermost layer 50A of the film 50 is preferably electrically insulative, and a lowermost layer 50C directly contacting the metallic wires 43A and 43B and the connection 44 thereof is preferably made of such material that is inert thereto. The term "inert" herein means that the lowermost layer 50C does not substantially react with the metallic wires 43A and 43B and the connection 44 thereof at least within a range of a process temperature of the semiconductor wafers.

The film 50 having a desired function can be obtained by suitably selecting substances of different refractive indexes and stacking the same, considering the materials, the number, and the thicknesses of the respective layers 50A to 50C of the film 50.

The reflectivity of a portion of the thermocouples 42, on which the film 50 is formed, for a light of any wavelength within the range of 0.5 to 5 µm is preferably 80% or below, more preferably 50% or below. In this way, a response of each thermocouple 42 can be significantly improved. The reflectivity above 80% is not preferable, in that the rising of the temperature of the thermocouples is slower than that of the semiconductor wafers. It should be noted that light of the wavelength within the range of 0.5 to 5 µm can heat the semiconductor wafers most efficiently in a temperature range (100 to 1200° C.) for processing semiconductor wafers.

More preferably, the film 50 is formed of the same, or substantially the same material as that of the object to be processed, that is, the semiconductor wafer. In this way, various characteristics of the film 50 are close to those of the semiconductor wafer. Thus, temperature-raising characteristics of the thermocouple 42 become close to those of the semiconductor wafer.

From this point of view, the film 50 is preferably composed by alternately stacking, for example, a silicon nitride layer and a silicon layer along the thickness direction of the film 50. In the embodiment shown in FIG. 4, the film 50 is composed by stacking three layers, i.e., a silicon nitride layer 50A, a silicon layer 50B, and a silicon nitride layer 50C. The silicon nitride layers 50A and 50C are 0.1 to 0.3 µm thick, the silicon layer 50B is 1 to 3 µm thick, and the overall thickness of the film 50 is in a range of 1.2 to 3.6 µm. That is, the thickness of the silicon layer 50B, which is formed of the same material as that of the semiconductor wafer, is sufficiently thicker than those of the silicon nitride layers 50A and 50C in order that the reflectivity of the whole film becomes close to that of the semiconductor wafer. The silicon nitride, which forms the layers 50A and 50C, is selected because it is electrically insulative and inert to the metallic wires, as described above. Since the reflectivity of the silicon nitride differs from that of the semiconductor wafer, the thicknesses of the silicon nitride layers 50A and 50C are made requisite minimum ones. It is noted that the layers 50A and 50C are not made of completely different material from the silicon layer 50B, but made of silicon nitride including silicon. The silicon layer 50B is preferably made of silicon doped with phosphate (P), for example. In this case, compared to the film 50 composed of a silicon layer which is not doped with phosphate, it is possible to reduce the reflectivity approximately by 20% for a light of any wavelength within the range of 0.5 to 5 µm, so that an excellent antireflective effect can be obtained.

The number of the layers of the film 50 may also be 2 or less, or 4 or more. The thicknesses of the respective layers are not limited to the above embodiment.

The film 50 may also be formed of a material that has an excellent thermal conductivity, e.g., silicon carbide (SiC), aluminum nitride (AlN), and so on. A black-colored material is specifically preferable so as to effectively reduce the reflectivity.

A heat treatment for the object to be processed (semiconductor wafer) executed in a vertical-type heat treatment apparatus is described below. Loading of semiconductor wafers is carried out in the loading area L. The wafer boat 17 carrying the semiconductor wafers thereon is mounted on the boat support 22A when the lid 20 is in a lowermost position. Then, the lid 20 is elevated by the elevating mechanism 21, so that the wafer boat 17 is loaded into the processing vessel 11 from the lower end opening 11C, which is then air-tightly closed by the lid 20. Dummy wafers are held on the uppermost and lowermost stages of the wafer boat 17.

The exhaust mechanism reduces a pressure in the processing vessel 11 to a predetermined pressure, e.g., about 13Pa. The tubular heater 30 and the plane heater 32 heat the processing vessel 11 to a predetermined temperature. When the rotary driving means 23 rotates the wafer boat 17, processing gas is introduced in the processing vessel 11 through the gas supply pipe 15. Then, the semiconductor wafers are subjected to a film-forming process.

According to this embodiment, the film 50 is formed on the thermocouple 43, that is, on the surfaces of the metallic wires 43A and 43B and the connection 44 thereof. Thus, the reflectivity of the temperature measuring part (connection 44) for the radiant light emitted from the semiconductor wafers is reduced (the emissivity thereof is increased).

The temperature of each thermocouple is rapidly raised by receiving the radiant light emitted from the semiconductor wafers. That is, each thermocouple is capable of measuring transient change in temperature of the semiconductor wafers more accurately. A temperature control by the tubular heater 30 and the plane heater 32 can be carried out more accurately especially when raising the temperature, so that the processing vessel 11 and the semiconductor wafers can be heated to a predetermined temperature more rapidly. Accordingly, it is possible to improve a throughput by reducing the total time needed for the processing.

Due to the provision of the electrically insulative silicon nitride layer 50A, neither electrically insulative members 62A nor 62B made of alumina ceramics or the like (see, FIG. 6) is needed for insulating the adjacent metallic wires. Thus, a calorific capacity of the thermocouple unit 42 is reduced, and thus each thermocouple 42 can more accurately measure transient change in temperature of the semiconductor wafers.

Since all the thermocouples 42 can measure the temperature of the semiconductor wafers with high accuracy, the zone temperature control can be suitably carried out. Thus, the semiconductor wafers can be heat treated with in-plane temperature uniformity and temperature uniformity between the semiconductor wafers placed on different levels.

Since the layer 50C, which is in contact with the metallic wires 43A and 43B and the connection 44 thereof, is made of inert material thereto, it is possible to prevent the formation of an alloy between the metallic wires 43A and 43B and the connection 44 thereof and the material forming the film 50, and resultant undesired problems such as breakage of the film 50 or the metallic wires 43A and 43B and the connection 44 thereof of each thermocouple 42.

Although embodiments of the present invention have been described above, the present invention is not limited thereto, and various modifications and changes are possible. For example, the heat treatment apparatus according to the present invention is not limited for performing a film-forming process, and may be configured to perform treatments, such as oxidation, diffusion and annealing. Further, the heat treatment apparatus is not limited to a so-called vertical-type one, and may be of a different type.

EXPERIMENTS

Experiment results performed by employing the heat treatment apparatus shown in FIG. 1 are described below. Thermocouples A to D having below specifications were prepared as follows:

[Thermocouple A]

A thermocouple was made by using a platinum wire (43A) and a platinum-rhodium alloy wire (43B) both having a diameter of 0.3 mm. A film (50) composed of a silicon nitride layer (50A), a silicon layer (50B), and a silicon nitride layer (50C) was formed on the surfaces of the metallic wires (43A, 43B) and a connection (44) thereof in a manner shown in FIG. 4. A silicon nitride layer (50C) as a first layer (lowermost layer) was 0.2 µm thick, the silicon layer (50B) as a second layer was 2 µm thick, and the silicon nitride layer (50A) as a third layer (uppermost layer) was 0.2 µm thick. A reflectivity of the thermocouple (42), at a portion on which the film (50) was formed, for a light of any wavelength within the range of 0.5 to 5 µm was 80% or below. This thermocouple is called "thermocouple A".

[Thermocouple B]

As shown in FIG. 6, a thermocouple unit was made by inserting the metallic wires (43A, 43B) of the thermocouple (A) into tubular electrically insulative members (62A, 62B) made of alumina ceramics. The specifications of the film (50) were the same as those of the thermocouple A. This thermocouple is called "thermocouple B".

[Thermocouple C]

A comparative thermocouple was made which had the same structure as that of the thermocouple A but a film was not made on the surfaces of the respective metallic wires and the connection thereof. This thermocouple is called "thermocouple C".

[Thermocouple D]

A second comparative thermocouple was made which had the same structure as that of the thermocouple B but a film was not made on the surfaces of the respective metallic wires and the connection thereof. This thermocouple is called "thermocouple D".

Figure 5:
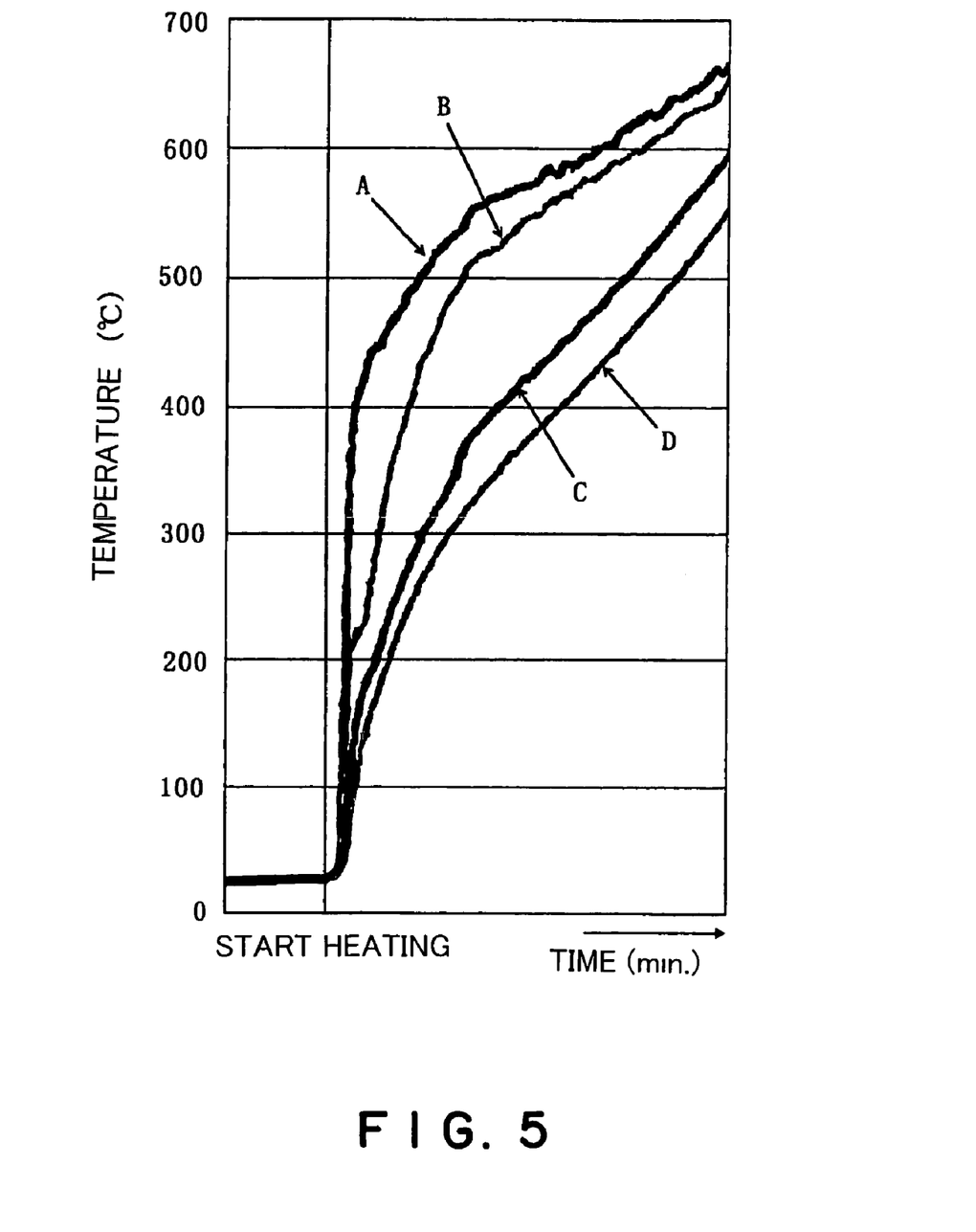
FIG. 5 is a graph showing a transient response characteristic of the thermocouple during heating operation.

Each of the four thermocouples A to D was mounted on a center portion in a height direction of the empty wafer boat (17) holding no object to be processed thereon. The wafer boat (17) was loaded into the processing vessel (11). Then, the tubular heater (30) and the plane heater (32) were operated for a few minutes with a constant output power. FIG. 5 shows the results of the rising of the temperatures of the respective thermocouples when heated.

As shown in FIG. 5, rising of the temperatures of the thermocouples A and B according to the present invention were more rapidly than those of the comparative thermocouples C and D. Therefore, it was confirmed that a response of a thermocouple can be improved by forming a film having an antireflective function on surfaces of metallic wires and a connection thereof.

The invention claimed is:

1. A heat treatment apparatus comprising:
   a processing vessel;
   a heater adapted to heat an object to be processed placed in the processing vessel;

a temperature sensor unit arranged in the processing vessel; and a controller adapted to control an output power of the heater based on a temperature data measured by the temperature sensor unit, wherein the temperature sensor unit includes a protective tube and a thermocouple having a pair of metallic wires contained in the protective tube and connected to each other at a connection, and wherein a film having an antireflective function is formed at least on a surface of the connection of the metallic wires.

2. The heat treatment apparatus according to claim 1, wherein:

the film having the antireflective function is formed of a plurality of layers; and an uppermost layer, with respect to a direction of thickness of the film, of the plurality of layers is electrically insulative.

3. The heat treatment apparatus according to claim 2, wherein a layer of the plurality of layers directly contacting the metallic wires of the thermocouple is made of a material inert to the metallic wires.

4. The heat treatment apparatus according to claim 3, wherein the plurality of layers include layers made of silicon nitride as the uppermost layer and the layer directly contacting the metallic wires of the thermocouple, and include a layer made of silicon arranged between the layers made of silicon nitride.

5. The heat treatment apparatus according to claim 4, wherein the layer made of silicon is doped with phosphate.

6. The heat treatment apparatus according to claim 1, wherein a reflectivity of a portion, on which is the film is formed, of the thermocouple for a light of any wavelengths within a range of 0.5 to 5 μm is 80% or below.

7. The heat treatment apparatus according to claim 1, wherein:

the object is a silicon wafer;

the film includes a plurality of layers;

the plurality of layers includes a layer made of silicon; and the layer made of silicon has a thickness greater than any layers of the plurality of layers other than the layer made of silicon.

8. The heat treatment apparatus according to claim 7, wherein the layer made of silicon is doped with phosphate.

9. The heat treatment apparatus according to claim 7, wherein the plurality of layers include an uppermost, electrically insulative layer, with respect to a direction of thickness of the film, and a layer directly contacting the metallic wires of the thermocouple and made of a material inert to the metallic wires, and wherein the layer made of silicon is interposed between the electrically insulative layer and the layer made of the material inert to the metallic wires.

10. The heat treatment apparatus according to claim 1, wherein:

the processing is adapted to load an object holder holding a plurality of objects vertically spaced at intervals;

the heater is configured so that the heater is capable of controlling temperatures of respective heating zones defined by dividing the processing vessel into a plurality of areas with respect to a vertical direction;

the protective tube extends vertically in the processing vessel;

there is a plurality of said thermocouples, and the plurality of thermocouples are arranged at positions respectively corresponding to the heating zones.

11. The heat treatment apparatus according to claim 1, wherein:

a plurality of said thermocouples are contained in the protective tube; and films having the antireflective function are provided entirely on portions of the metallic wires of the thermocouples located within the protective tube, and also have a function of electrically isolating the metallic wires of the thermocouples from each other.

* * * * *